United States Patent [19]

Muramoto et al.

[11] Patent Number: 5,115,020
[45] Date of Patent: May 19, 1992

[54] COMPOSITE RESIN PARTICLES AND PREPARATION THEREOF

[75] Inventors: Hisaichi Muramoto, Osaka; Yusuke Ninomiya; Keizou Ishii, both of Hyogo; Shinichi Ishikura, Kyoto, all of Japan

[73] Assignee: Nippon Paint Co., Ltd., Osaka, Japan

[21] Appl. No.: 556,258

[22] Filed: Jul. 19, 1990

[30] Foreign Application Priority Data

Jul. 19, 1989 [JP] Japan .................................. 1-188399

[51] Int. Cl.⁵ ............................................. C08G 63/48
[52] U.S. Cl. ....................................... 525/74; 525/78; 525/186; 525/221; 525/419; 525/903; 525/64
[58] Field of Search ................. 525/64, 419, 186, 221, 525/74, 78, 903

[56] References Cited

U.S. PATENT DOCUMENTS 4,500,688  2/1985  Arkles ................................. 525/464
4,829,127  5/1989  Muramoto et al. ................. 525/309

*Primary Examiner*—Melvyn I. Marquis
*Attorney, Agent, or Firm*—Wenderoth, Lind & Ponack

[57] ABSTRACT

The invention concerns a process for preparing composite resin particles having the so-called semi-IPN (inter penetration network) structure, in which linear thermoplastic polymer chains get entangled with a crosslinked polymer core through partial or thorough penetration. This method is very important in that both of the chain polymer and core polymer are freely selected from various resins.

1 Claim, No Drawings

COMPOSITE RESIN PARTICLES AND PREPARATION THEREOF

FIELD OF THE INVENTION

The present invention relates to a novel method for the preparation of composite resin particles having the so-called semi-IPN (inter penetration network) structure in which linear thermoplastic polymer chains get entangled with crosslinked polymer core by thorough or partial penetration, and the composite resin particles thus prepared.

BACKGROUND OF THE INVENTION

Composite resin particles being of the so-called semi-IPN structure, each of which comprises a crosslinked polymer core and a number of linear, non-crosslinked, thermoplastic polymer chains intertwined with said core through partial or thorough penetration, can exhibit both film-forming property of the thermoplastic polymer chain portion and polymer filler effect of the crosslinked polymer core portion and can formulate various polymer blends with other coating use resins which are compatible with said thermoplastic polymer. Therefore, great hopes are entertained of such resin particles either singularly or in the combination form with other resins as additives in various technical fields including paint, polymer filler, optical material, adhesive, dental material, medicine delay releasing material and the like.

However, such composite resin particles of the semi-IPN structure heretofore proposed have been prepared by the double-stage emulsion polymerization (the so-called core-shell process) (e.g. L. H. Sperling; Interpenetrating Polymer Networks and Related Materials, pages 75 to 78, 1981) and therefore, both of the crosslinked polymer core and thermoplastic polymer chains are inevitably limited to the radically polymerizable resins only. It is, therefore, a principal object of the invention to establish a novel process for the preparation of composite resin particles of semi-IPN structure, each particle having a crosslinked polymer core and a number of linear, non-crosslinked, thermoplastic polymer chains intertwined with said core, in which both of the core polymer and chain polymer are freely selected from various resins including vinyl resin to be prepared by a radical polymerization technique and other resins to be prepared by non-radical polymerization as polyester, polyether, polyurethane, polyamide, epoxy resins and the like. Another object of the invention is to provide novel composite resin particles having improved toughness, softness, transparency and the like, prepared by the present process.

SUMMARY OF THE INVENTION

According to the invention, the abovementioned objects can be attained with
1. Composite resin particles prepared by dispersing in an aqueous medium a uniform mixture of
    (A) a crosslinked structure-forming component having a number average molecular weight of about 180 to 1,000,000 selected from a resin having both dispersive power and crosslinking property or a combination of two organic compounds each bearing mutually reactive functional groups which are required for the formation of crosslinked high molecular weight compound when said two compounds are reacted with each other, at least one of said organic compounds having dispersive power, and
    (B) a none-crosslinking thermoplastic resin which is not reactive with said (A) component, effecting a crosslinking of the crosslinked structure-forming components in the dispersed particles, and removing the aqueous medium.
2. A method for preparing the composite resin particles of Claim 1 which comprises a combination of steps of dispersing in an aqueous medium a mixed solution of
    (A) a crosslinked structure-forming component having a number average molecular weight of about 180 to 1,000,000 selected from a resin having both dispersive power and crosslinking property or a combination of two organic compounds each bearing mutually reactive functional groups which are required for the formation of crosslinked high molecular weight compound when said two compounds are reacted with each other, at least one of said organic compounds having dispersive power,
    (B) a none-crosslinking thermoplastic resin which is not reactive with said (A) component, and
    (C) an organic solvent which is a solvent of said (A) or (B), effecting a crosslinking of the crosslinked structure-forming components in the dispersed particles, and removing the aqueous solvent and the organic solvent.

PREFERRED EMBODIMENTS OF THE INVENTION

The present process was named by the inventors as post emulsion process for convenient sake and therefore, such term is used hereinunder. The crosslinked structure-forming component may be a resin having both dispersive power and crosslinking property or a combination of two organic compounds each bearing mutually reactive functional groups which are required for the formation of crosslinked high molecular weight compound when said two compounds are reacted with each other, at least one of said organic compounds having a dispersive power. The term "dispersive power" as used herein shall mean the capacity to maintain the resin in water or an aqueous medium containing a water miscible organic solvent in a stabilized dispersion form at the molecular or molecular aggregate level. The resin per se may be of such nature as being stably dispersible in an aqueous medium as in polyvinyl alcohol or in the case of hydrophobic resin, the dispersive power shall denote the hydrophilic group (nonionic, ionic or amphoionic functional group) required for maintaining the resin in an aqueous medium in a stabilized dispersion form. The term "crosslinking property" shall mean the capacity to convert the resin to a crosslinked resin by the application of light, heat or the like. More specifically, it means a radically reactive group or a combination of 2 or more mutually reactive functional groups as, for example, combinations of oxirane and amine, oxirane and carboxyl, hydroxyl and alkoxy groups and the like. Examples of such resins having both dispersive power and crosslinking property are vinyl resin, polyester resin, polyether resin, polyurethane resin, polyamide resin, epoxy resin or other synthetic high molecular weight compounds, as well as rubber elastomers. In the latter mentioned combination of organic compounds, any combination of two organic compounds may be satisfactorily used, providing having mutually reactive functional groups on said two and hydrophilic group for dispersive power on at least one organic compound and providing that said two compounds are compatible to some extent with each other. Therefore, even at this time, the formed high molecular weight compounds can never be limited to vinyl resin only, and they may be of various resinous nature as above mentioned. In practical sense, number average molecular weight of such compound used as crosslinked structure-forming component should preferably be in a range of about 180 to 1,000,000.

In this invention, besides the abovementioned component (A), non-crosslinking, thermoplastic resin is used as component (B). Such resin may be any conventional linear, thermoplastic resins having no functional groups reactive with said (A) component. In some cases, such functional groups may be permissible and however, at that time, these groups must be maintained in inert form not so as to be involved in crosslinking reaction.

The abovementioned components (A) and (B) are dissolved in an organic solvent. However, since the object is to obtain a uniform mixture of A and B components, the organic solvent used cannot always be an absolute solvent for both A and B components and it may be a solvent for either component A or B, providing being useful for maintaining the other component B or A in its dispersion form. Examples of such solvents are toluene, xylene, dichloroethane, chlorobenzene, cyclohexanone and the like. If desired, alcohols, ketones, esters, ethers and the like may be used. Under certain circumstances, no solvent is used and components A and B are mixed together.

When the uniform mixture of components A and B and organic solvent is mechanically dispersed in water or an aqueous medium consisting of water and a water miscible organic solvent, a uniform and stable emulsion can be obtained because of the emulsifying capacity possessed by said A component. However, if desired, external emulsifier may be used.

Thus, in the present process, an emulsion in which a uniform mixture of the crosslinked structure-forming component A (which is not yet crosslinked) and linear, non-crosslinking, thermoplastic polymer component B and organic solvent is dispersed as fine droplets in an aqueous medium is first prepared. If desired, crosslinking catalyst, coloring material, pharmaceuticals and other additives may be added to the abovementioned uniform mixture.

In the next step, crosslinking reaction is effected within the abovementioned fine liquid droplets by applying light or heat energy thereupon. At that time, only the A component takes part in the crosslinking reaction and since the component B is of non-crosslinking nature and has no functional groups which are reactive with said component A, there results an emulsion of heterogeneous liquid particles comprising composite resin particles each of which comprises a crosslinked polymer core and a number of linear, non-crosslinked, thermoplastic polymer chains intertwined with said core through partial or thorough penetration, and organic solvent. After said crosslinking reaction, the formed composite resin particles may be separated by salting-out or the like and dried, or the abovementioned emulsion is subjected to spray-drying, freeze-drying or the like to remove the organic solvent and water to obtain the present composite resin particles of semi-IPN structure. Differing from the heretofore proposed processes of using a radical polymerization technique only, the present method can afford the composite resin particles whose core and interpenetrated linear polymer chains are composed of various resins as desired. Therefore, the composite resin particles can be easily tailor-made so as to give improved toughness, softness, transparency or the like and they are specifically useful as coating material, filler or functional particles in various technical fields as coating composition, ink, adhesive, resin molding product, cosmetic and the like.

The invention shall be now more fully explained in the following examples. Unless otherwise being stated, all parts and percentages are by weight.

REFERENCE EXAMPLE 1

Preparation of resin having both hydrophilic group and crosslink-reactive functional group Into a 2l four-necked flask fitted with a stirrer, a reflux condenser and a thermometer, were placed 720 parts of BN-1015 (maleinized polybutadiene, manufactured by Nippon Soda K.K.), 130 parts of 2-hydroxyethyl methacrylate, 213 parts of cyclohexanone and 0.1 part of hydroquinone and the mixture was reacted at 150° C. for 1 hour. Thus obtained resin product showed a solid content of 80%, a number average molecular weight of 1,680 and an acid value of 68. From IR spectrum analysis, it was found that the resin had a radically polymerizable double bond.

REFERENCE EXAMPLE 2

Preparation of resin having both hydrophilic group and crosslink-reactive functional group Into a 1l four-necked flask fitted with a stirrer, a reflux condenser, a nitrogen gas inlet tube and a thermometer, were placed 109 parts of pyromellitic anhydride, 735 parts of Placcel FM-5 (trademark, 5:1 mol addition product of 2-hydroxyethyl methacrylate: ε-caprolactone, manufactured by Daicel Chem. Co. Ltd.), 200 parts of butyl acetate and 500 ppm to the total charge of hydroquinone monomethyl ether, and the mixture was reacted under air stream at 150° C. for 1 hour. Thereafter, butyl acetate was distilled off under reduced pressure to obtain a resin product having a solid content of 97%, a number average molecular weight of 1,620 and an acid value of 66. From IR spectrum analysis, it was found that the resin had a radically polymerizable double bond.

REFERENCE EXAMPLE 3

Preparation of resin having both hydrophilic group and crosslink-reactive functional group Into a 2l four-necked flask fitted with a stirrer, a reflux condenser, a nitrogen gas inlet tube and a thermometer, were placed 5 parts of glycidyl methacrylate, 20 parts of NK-230G (trademark, 1:23 mol addition product of methacrylic acid having an end methoxy group:ethyleneoxide, manufactured by Shin Nakamura Chem. Co. Ltd.), 20 parts of styrene, 25 parts of methyl methacrylate, 30 parts of n-butyl acrylate, 1 part of V-70 (2,2'-azobis (4-methoxy-2,4-dimethyl valeronitrile, manufactured by Wako Junyaku K.K.) and 66.7 parts of xylene and the mixture was reacted under nitrogen gas stream at 35° C. for 15 hours. Thus obtained resin product showed a solid content of 40% and a number average molecular weight of the contained resin of 10,000. IR spectrum analysis showed that the resin had oxolane rings.

REFERENCE EXAMPLE 4

Preparation of resin having both hydrophilic group and crosslink-reactive functional group Into a 2l four-necked flask fitted with a stirrer, a reflux condenser, a nitrogen gas inlet tube and a thermometer, were placed 3 parts of methacrylic acid, 20 parts of NK-230G (trademark, 1:23 mol addition product of methacrylic acid having an end methoxy group-:ethylene oxide, manufactured by Shin Nakamura Chem. Co. Ltd.), 20 parts of styrene, 25 parts of methyl methacrylate, 30 parts of n-butyl acrylate, 6 parts of polymerization initiator Kayaester 0 (trademark, t-butyl peroxy-2-ethylhexanoate, manufactured by Kayaku Akzo. K.K.) and 42.9 parts of xylene, and the mixture was reacted under nitrogen gas stream at 135° C. for 3 hours. Thus obtained resin product had a solid content of 70%, and an acid value of the solid of 59. Number average molecular weight of the resin was 3,000.

EXAMPLE 1

Dispersion step 500 parts of a solution (solid content 20 wt %) of BR-02L (trademark, polybutadiene, number average molecular weight of about 250,000~300,000, manufactured by Japan Synthetic Rubber) in xylene (as thermoplastic resin), 300 parts of the resin product obtained in Reference Example 1 and 50% neutralized with ammonia (as resin having both hydrophilic group and crosslink-reactive functional group), and 1 part of radical polymerization initiator V-65 (trademark, 2,2'-azobis-2,4-dimethyl valeronitrile, manufactured by Wako Junyaku) were combined and stirred well to obtain a uniform mixture. To this, 900 parts of deionized water were added and the combined was subjected to emulsification by using a homogenizer at 40° C. for 30 minutes.

Crosslinking step

Thus obtained emulsion was placed in a 2l four-necked flask fitted with a stirrer, a reflux condenser, a nitrogen gas inlet tube and a thermometer, and crosslinking reaction was carried out by a radical polymerization technique, under nitrogen gas stream, at 75° C. for 1 hour.

Organic solvent removing step

Using a rotary evaporator, organic solvent was removed off under reduced pressure (20 mmHg, 40° C.) and recovered from thus obtained emulsion. Thus obtained resin emulsion contained particles having an average diameter (determined by Laser light scattering method) of 0.33μ.

EXAMPLE 2

Dispersion step 300 parts of a solution (solid content 70 wt %) of Lutonal A50 (trademark, polyvinyl ethyl ehter, number average molecular weight of about 3,600, manufactured by BASF) in toluene (as thermoplastic resin), 10 parts of NK-14G (trademark, polyoxyethylene dimethacrylate (ethylene oxide 14 mol addition product), number average molecular weight of about 750, manufactured by Shin Nakamura Chem. Co. Ltd.) (as resin having both hydrophilic group and crosslink-reactive functional group) and 1 part of radical polymerization initiator V-65 (trademark, 2,2'-azobis-2,4-dimethyl valeronitrile, manufactured by Wako Junyaku) were combined and stirred well to obtain a uniform mixture. To this, 900 parts of deionized water were added and the combined was subjected to emulsification by using a homogenizer at 40° C. for 30 minutes.

Crosslinking step

Thus obtained emulsion was placed in a 2l four-necked flask fitted with a stirrer, a reflux condenser, a nitrogen gas inlet tube and a thermometer, and crosslinking reaction was carried out by a radical polymerization technique under nitrogen gas stream at 75° C. for 1 hour.

Organic solvent removing step

Using a rotary evaporator, organic solvent was removed off under reduced pressure (20 mmHg, 40° C.) and recovered from thus obtained emulsion. Thus obtained resin emulsion contained particles having an average diameter (determined by Laser light scattering method) of 8.48μ.

EXAMPLE 3

Dispersion step 200 parts of a solution (solid content 60 wt %) of polytetramethylene glycol (number average molecular weight 10,000) in butyl acetate (as thermoplastic resin), 200 parts of the resin product obtained in Reference Example 2 and 100% neutralized with diethyl ethanol amine, and 2 parts of radical polymerization initiator V-65 (trademark, 2,2'-azobis-2,4-dimethyl valeronitrile, manufactured by Wako Junyaku K.K.) were combined and stirred well to obtain a uniform mixture. To thie, 950 parts of deionized water were added and the combined was subjected to emulsification by using a homogenizer at 40° C. for 30 minutes.

Crosslinking step

Thus obtained emulsion was placed in a 2l four-necked flask fitted with a stirrer, a reflux condenser, a nitrogen gas inlet tube and a thermometer, and crosslinking reaction was carried out by a radical polymerization technique, under nitrogen gas stream, at 75° C. for 1 hour.

Organic solvent removing step

Using a rotary evaporator, organic solvent was removed off under reduced pressure (20 mmHg, 40° C.) and recovered from thus obtained emulsion. Thus obtained resin emulsion contained particles having an average diameter (determined by Laser light scattering method) of 1.34μ.

EXAMPLE 4

Dispersion step 60 parts of a solution (solid content 80 wt %) of poly ε-caprolactone (number average molecular weight 5,000) in butyl acetate (as thermoplastic resin), 300 parts of the resin product of Reference Example 3 and 42.3 parts of 1,12-diamino dodecane (as crosslinking agent) were combined and stirred well to obtain a uniform mixture. To this, 900 parts of deionized water and the combined was subjected to emulsification by using a homogenizer at 20° C. for 30 minutes.

Crosslinking step

Thus obtained emulsion was placed in a 2 l four-necked flask fitted with a stirrer, a reflux condenser, a nitrogen gas inlet tube and a thermometer, and crosslinking reaction was carried out under nitrogen gas stream at 40° C. for 12 hours.

Organic solvent removing step

Using a rotary evaporator, organic solvent was removed off under reduced pressure (20 mmHg, 40° C.) and recovered from thus obtained emulsion. Thus obtained resin emulsion contained particles having an average diameter (determined by Laser light scattering method) of 5.16μ.

EXAMPLE 5

Dispersion step 200 parts of a solution (solid content 60 wt %) of polystyrene (number average molecular weight 50,000) in xylene (as thermoplastic resin), 300 parts of the resin product of Reference Example 4 and 24 parts of 2,2'-(1,3-phenylene)-bis(2-oxazoline) (crosslinking agent manufactured by Takeda Chem. Co. Ltd.) were combined and stirred well to obtain a uniform mixture. To this, deionized water was added and the combined was subjected to emulsification by using a homogenizer at 20° C. for 30 minutes.

Crosslinking step

Thus obtained emulsion was placed in a 2 l four-necked flask fitted with a stirrer, a reflux condenser, a nitrogen gas inlet tube and a thermometer, and crosslinking reaction was carried out by a radical polymerization technique, under nitrogen gas stream, at 50° C. for 12 hours.

Organic solvent removing step

Using a rotary evaporator, organic solvent was removed off under reduced pressure (20 mmHg, 40° C.) and recovered from thus obtained emulsion. Thus obtained resin emulsion contained particles having an average diameter (determined by Laser light scattering method) of 10.16μ.

EXAMPLE 6

Preparation of dried particles

To the emulsion obtained in Example 1, 3 parts of potassium chloride were added to effect aggregation of particles and the aggregate was separated from aqueous medium by vacuum filtration. Thus obtained aggregate was dried under reduced pressure (1~2 mmHg, 40° C.) for 12 hours to obtain about 340 parts of dried particles.

EXAMPLE 7

Preparation of dried particles

The emulsion obtained in Example 1 was subjected to freeze-drying at −50° C. to obtain about 340 parts of dried particles.

What is claimed is:

1. A method for preparing composite resin particles which comprises a combination of steps of dispersing in an aqueous medium a mixed solution of
    (A) a crosslinked structure-forming component having a number average molecular weight of about 180 to 1,000,000 selected from a resin having both dispersive power and crosslinking properties or a combination of two organic compounds each bearing mutually reactive functional groups which are required for the formation of a crosslinked high molecular weight compound when said two compounds are reacted with each other, at least one of said organic compounds having dispersive power,
    (B) a non-crosslinking thermoplastic resin which is not reactive with said (A) component, and
    (C) an organic solvent which is a solvent for said components (A) or (B), effecting a crosslinking of the crosslinked structure-forming components in the dispersed particles, and removing the aqueous solvent and the organic solvent.

* * * * *